United States Patent [19]

Sato

[11] 4,277,805
[45] Jul. 7, 1981

[54] COMBINATION COPYING-FACSIMILE REPRODUCTION APPARATUS

[75] Inventor: Yojiro Sato, Tokyo, Japan

[73] Assignee: Ricoh Company, Ltd., Tokyo, Japan

[21] Appl. No.: 967,835

[22] Filed: Dec. 8, 1978

[30] Foreign Application Priority Data

Dec. 27, 1977 [JP] Japan ............................. 52-159717

[51] Int. Cl.³ ............................................. H04N 1/42
[52] U.S. Cl. .................................. 358/286; 358/256; 358/284
[58] Field of Search ................. 358/83, 256, 280, 284, 358/286, 294, 75, 296, 300, 130, 127, 132, 162, 166, 37; 346/153, 160; 355/8

[56] References Cited

U.S. PATENT DOCUMENTS

| 3,109,060 | 10/1963 | Beach | 358/130 |
| 3,681,527 | 8/1972 | Nishiyama | 358/300 |
| 3,780,215 | 12/1973 | Shibata et al. | 358/37 |
| 3,898,470 | 8/1975 | Hemphill | 358/286 |
| 3,920,889 | 11/1975 | Connor | 358/166 |
| 3,934,081 | 1/1976 | Schumacher | 358/256 |
| 3,961,366 | 6/1976 | Weishaupt | 358/256 |
| 4,134,668 | 1/1979 | Coborn | 358/300 |

Primary Examiner—Joseph A. Orsino, Jr.
Attorney, Agent, or Firm—David G. Alexander

[57] ABSTRACT

An optical imaging system (18) radiates a light image of an original document (13) onto a photoconductive drum (16) to form a first electrostatic image. The light image is also focussed on a photosensor array (44) which produces electrical signals corresponding thereto. These signals are fed through a contour compensation circuit (49) which increases the contrast at the black-white transition points of the image and thereby at the contours of the image areas. The contour compensated signals are radiated by an array of light emitting elements (46) onto the drum (16) to form a second electrostatic image which is superimposed on the first electrostatic image. The result is an increase in the apparent resolution of a copy or reproduction produced by applying toner to the drum (16) to form a toner image and transferring and fixing the toner image to a copy sheet. The arrays (44) and (46) may be used separately for facsimile transmission and reception respectively.

6 Claims, 8 Drawing Figures

COMBINATION COPYING-FACSIMILE REPRODUCTION APPARATUS

BACKGROUND OF THE INVENTION

The present invention relates to an electrostatic copying or reproduction apparatus which is adapted to bifunction as a facsimile transceiver. More specifically, the present invention provides novel means for increasing the apparent resolution of electrostatic copies produced by such an apparatus.

A conventional electrostatic copying machine comprises a photoconductive drum and means for forming a uniform electrostatic charge on the drum. An optical system then radiates a light image of an original document onto the drum to form an electrostatic image. A toner substance is applied to the drum to develop the electrostatic image and form a toner image which is transferred and fixed to a copy sheet to provide a permanent copy or reproduction of the original document.

Such a copying machine can be adapted to bifunction as a facsimile transceiver by providing scanning means such as a photosensor array for producing electrical signals corresponding to an original document. These signals are transmitted to a remote apparatus for reproduction. The copying machine is further provided with electronic imaging means comprising a fiber optic tube array for radiating a light image onto the drum corresponding to electrical signals received from a remote apparatus for reproducing an original document scanned by the remote apparatus.

In television, facsimile and other electronic image transmission it is desired to maximize the apparent resolution of the images. This may be accomplished by subjecting the electrical signals representing the images to a process known in the art as contour compensation. In this process the contrast at the transitions between light and dark image areas is increased, thereby increasing the contrast at the contours or outlines of the image.

Where an original document such as a printed page has a pure white background on which the printed characters are formed, contour compensation is generally unnecessary. However, many original documents have colored, yellowed, gray or otherwise non-white backgrounds which make it difficult to read the printed characters. Contour compensation functions to provide a pure white fringe or outline around the characters or other dark image portions which makes them much more legible.

However, such contour compensation cannot be accomplished in a purely optical imaging system such as found in the typical electrostatic copying machine. In a copying machine adapted to bifunction as a facsimile transceiver as described hereinabove, it is possible to provide contour compensation by disabling the optical system and performing contour compensation on the electrical signals produced by the electronic scanning means. These compensated signals are then applied to the electronic image forming means to form an electrostatic image on the drum. In other words, the optical system is not used to image the drum directly.

Although this expedient does enable contour compensation, it is undesirable in that the actual resolution attainable with the electronic scanning system is lower than that attainable with pure optical scanning. Whereas the optical scanning system provides a continuous image, the electronic scanning system produces a digitized image, the resolution depending on the number of scanning (and corresponding light emitting) elements per unit length in the arrays. At the present state of the art, the resolution produced by digitized scanning using a finite number of elements is lower than that produced by direct optical scanning.

SUMMARY OF THE INVENTION

A reproduction apparatus embodying the present invention includes a moving photoconductive member and optical imaging means for radiating a light image of an original document onto the photoconductive member to form an electrostatic image of the document on the photoconductive member. Electronic scanning means produce electrical signals corresponding to the document. Electronic imaging means radiate a light image onto the photoconductive member corresponding to electrical signals applied to the electronic imaging means. Control means connect an output of the scanning means to an input of contour compensation means and an output of the contour compensation means to an input of the electronic imaging means; the optical imaging means, electronic scanning means, contour compensation means and electronic imaging means being so constructed that an electrostatic image of the document formed on the photoconductive member by the electronic imaging means is superimposed on the electrostatic image of the document formed on the photoconductive member by the optical imaging means.

It is an object of the present invention to provide a combination copying-facsimile apparatus which is capable of producing electrostatic copies at higher apparent resolution than has been attainable heretofore.

It is another object of the present invention to provide a combination copying-facsimile apparatus which enables contour compensation in the electrostatic copying mode.

It is another object of the present invention to provide a reproduction apparatus capable of producing electrostatic copies having high actual resolution and apparent resolution.

It is another object of the present invention to provide a generally improved reproduction apparatus.

Other objects, together with the following, are attained in the embodiments described in the following description and shown in the accompanying drawing.

DESCRIPTION OF THE PREFERRED EMBODIMENTS

While the reproduction apparatus of the invention is susceptible of numerous physical embodiments, depending upon the environment and requirements of use, substantial numbers of the herein shown and described embodiments have been made, tested and used, and all have performed in an eminently satisfactory manner.

Before describing the detailed construction and operation of the present invention, the terms "actual resolution" and "apparent resolution" will be defined as used herein. Actual resolution means faithfulness of reproduction. Thus, a reproduction with perfect actual resolution will be absolutely identical to the original document. Apparent resolution refers to legibility. Black printed characters on a dark gray background will be hard to read, having low apparent resolution. Contour compensation functions to produce a white fringe around the characters or other dark areas, making them more distinguishable from the background and thereby more legible. Thus, contour compensation increases the apparent resolution while decreasing the actual resolution. The white fringes around the characters, while making them easier to read, constitute distortion when considered from the viewpoint of actual resolution.

Figure 1:
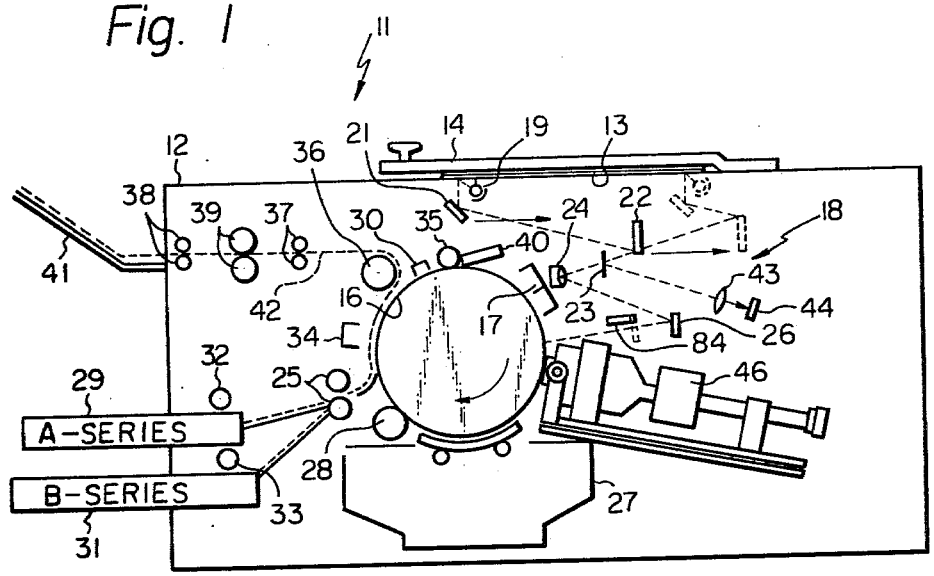
FIG. 1 is a schematic diagram of a reproduction apparatus to which the present invention relates.

Referring now to FIG. 1 of the drawing, a reproduction apparatus embodying the present invention is generally designated by the reference numeral 11 and comprises a housing 12. An upper surface of the housing 12 is made transparent and supports an original document 13 face down for reproduction. A pressure pad 14 presses the document 13 flat against the transparent surface for reproduction.

A photoconductive drum 16 is rotated within the housing 12 at constant speed in the clockwise direction. A corona charging unit 17 applies a uniform electrostatic charge to the drum 16. An optical imaging means 18 focusses a light image of the document 13 onto the drum 16 to form an electrostatic image by localized photoconduction. The optical imaging means 18 comprises a light source 19 which illuminates the document 13 and a mirror 21 which reflects a light image of a linear portion of the document 13 to a mirror 22. The mirror 22 reflects the image through a half-mirror 23 to a converging lens 24 having a reflecting rear surface. The lens 24 converges the image twice and reflects it to a mirror 26 which reflects the image onto the drum 16.

The light source 19 and mirror 21 are moved rightwardly at the same surface speed as the drum 16 for scanning the document 13 and progressively forming the electrostatic image thereof on the drum 16. The mirror 22 is also moved rightwardly, but at one-half the surface speed of the drum 16. It will be noted that the direction of movement of the light source 19 and mirrors 21 and 22 is perpendicular to the linear portion of the document 13 of which the light image is formed.

A liquid type developing unit 27 applies a toner substance to the drum 16 to develop the electrostatic image and produce a toner image. A roller 28 removes excess liquid from the drum 16.

A cassette 29 is constructed to contain copy sheets in the form of a stack. The cassette 29 is sized for sheets of the ISO A-series (A4, A5, etc.). A similar cassette 31 is provided for copy sheets of the ISO B-series. Depending on which copy sheet size is selected, a feed roller 32 or 33 will feed a copy sheet from the cassette 29 or 31 into the bite of feed rollers 25 which in turn feed the copy sheet into engagement with the surface of the drum 16. The feed rollers 25 feed the copy sheet at the same surface speed as the drum 16. A corona transfer charger 34 applies an electrostatic charge to the back of the copy sheet which causes the toner image to be transferred thereto from the drum 16. A separator roller 36 strips the copy sheet from the drum 16 after toner image transfer. Feed rollers 37 and 38 guide the copy sheet through fixing rollers 39 which fix the toner image thereto through heat, pressure or a combination thereof. The finished copy is discharged from the fixing rollers 39 into a tray 41 for use. A broken line curve 42 illustrates the path of the copy sheet from the cassette 29 or 31 to the tray 41.

Further illustrated are a corona discharge unit 30 for discharging the drum 16 after toner image transfer and a cleaning roller 35 and blade 40 for removing residual toner from the drum 16.

The apparatus 11 described thus far can be used to produce electrostatic copies in the conventional manner just described. However, the present apparatus 11 is adapted to bifunction as a facsimile transceiver and also to produce electrostatic copies in an improved manner which will now be described.

The apparatus 11 further comprises a converging lens 43. A portion of the light from the mirror 22 passes through the half-mirror 23 to the lens 24. However, another portion of the light from the mirror 22 is reflected by the half-mirror 23 through the lens 43 onto an electronic scanning means in the form of a photosensor array 44. Although not shown in detail, the array 44 comprises a large number of photosensor elements arranged in a linear manner and which may be of the CCD (charge-coupled-device) type. The same light image of the linear portion of the document 13 which is focussed on the drum 16 by the lens 24 is focussed on the array 44 by the lens 43. The photosensor elements produce electrical signals corresponding to incident light intensity.

The apparatus 11 further comprises an electronic imaging means 46 for radiating a light image onto the drum 16 in response to electrical signals. Although not shown in detail, the means 46 typically comprises an array of light emitting elements such as light-emitting diodes equal in number to the photosensor elements in the array 44. The light-emitting diodes are individually energizable in response to electrical signals. Light produced by the light-emitting diodes is transmitted through respective optical fiber tubes to the drum 16. The ends of the optical fiber tubes are arranged in a linear manner perpendicular to the direction of rotation of the drum 16.

Figure 2:
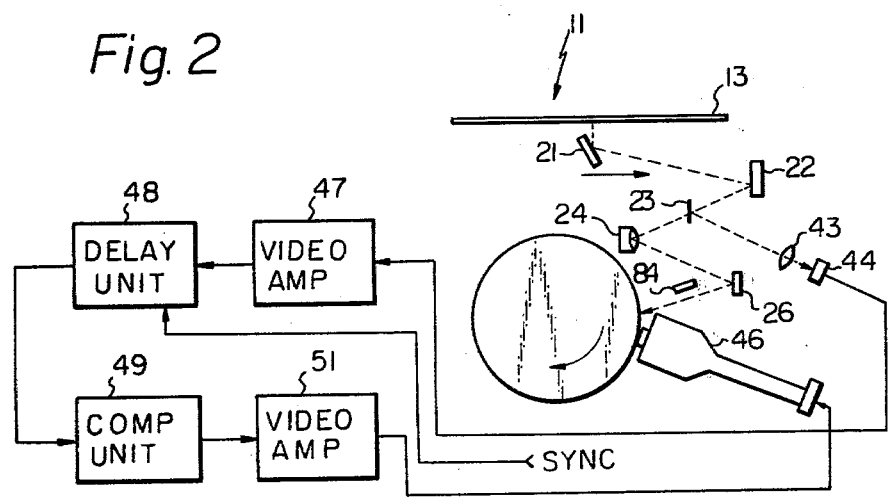
FIG. 2 is a schematic view illustrating the basic improvement of the present invention to the apparatus shown in FIG. 1.

FIG. 2 illustrates further component parts of the present apparatus 11. The output of the array 44 is fed to an input of a video amplifier 47, the output of which is connected to an input of a delay unit 48. Synchronization signals (SYNC) are also applied to the delay unit 48. The SYNC signals correspond to strobe signals applied to the array 44 causing the individual photosensor elements thereof to sequentially produce outputs.

The output of the delay unit 48 is connected to an input of a contour compensation unit 49 which operates on the signals to increase the contrast at the transitions between light and dark image areas. The output of the compensation unit 49 is fed through a video amplifier 51 to the imaging means 46.

It will be noted that the optical imaging means 18 is disposed upstream of the electronic imaging means 46 in the direction of rotation of the drum 16. The delay unit 48 comprises delay elements, shift registers or the like which delay the image radiated onto the drum 16 by the imaging means 46 for the exact length of time required for the corresponding electrostatic image formed by the imaging means 18 to reach the imaging means 46. In this manner, an electrostatic image is formed on the drum 16 by the imaging means 46 superimposed on the electrostatic image formed by the imaging means 18.

The electrostatic image formed by the optical imaging means 18 is continuous, and thereby has high actual resolution. The electrostatic image formed by the electronic imaging means 46 does not have as high actual resolution but is contour compensated by the compensation unit 49. Thus, the composite image is contour compensated.

The white fringes around the dark image areas produced by contour compensation cause photoconduction of the drum 16 and thereby take precedence over any gray background in these fringe areas. The composite image thereby has higher actual resolution than can be produced by electronic image formation and in addition is contour compensated to increase the apparent resolution. The composite image is thereby much more legible than has been possible heretofore.

Figure 3:
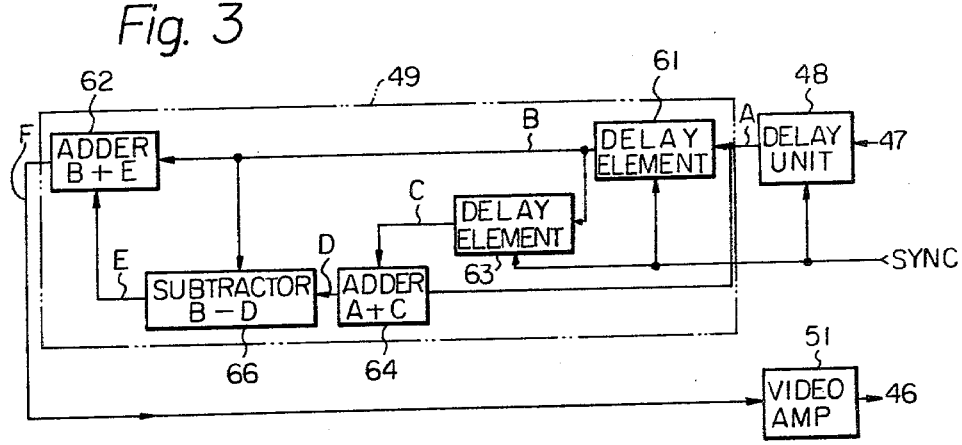
FIG. 3 is a block diagram of a first contour compensation means of the present invention.

A first embodiment of the contour compensation unit 49 is illustrated in FIG. 3. The electrical signals from the delay unit 48 are designated as A and are applied to an input of a delay element 61. The delay element 61 delays the signals A to produce signals B at its output which is connected to inputs of an adder 62 and a delay element 63. The delay element 63 delays the signals B to produce signals C at its output which is connected to an input of an adder 64. The adder 64 adds the signals A and C and produces signals D at its output which is connected to an input of a subtractor 66. The subtractor 66 subtracts the signals D from the signals B and produces signals E at its output which is connected to an input of the adder 62. The adder 62 adds the signals B and E and produces signals F which are fed to the video amplifier 51.

Figure 4:
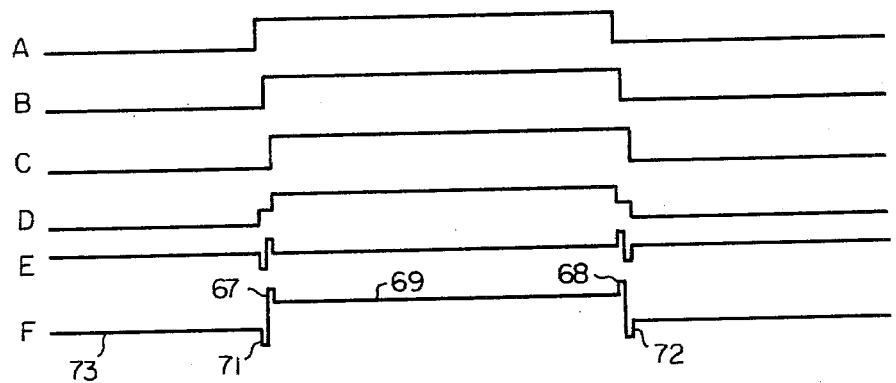
FIG. 4 is a timing diagram illustrating the operation of the contour compensation means of FIG. 3.

As illustrated in FIG. 4, addition of the signals A and C produces the signals D in the form of staircase signals. The leading and trailing edges of the signals D rise and fall in a stepwise manner following the leading and trailing edges of the signals A respectively. Subtraction of the signals D from the signals B produces a zero level signal having positive and negative spikes as illustrated. In FIG. 4, white image areas are designated by logically high signals and black image areas are designated by logically low (zero) signals respectively.

Addition of the signals B and E produces the signals F which have positive spikes 67 and 68 which are more white than a background level 69. The signals F further have negative spikes 71 and 72 which are more negative than the zero black image level 73. The spikes 67 and 68 produce the white fringes around the dark image areas of the copy. The spikes 71 and 72 serve to further increase the contrast of the image contours, although their contribution is not as noticable.

The adders 62 and 64 and subtractor 66 are typically analog elements and may be constituted by differential amplifiers or the like. They may further be constructed to adjust the input and/or output signal levels by algebraic addition or multiplication by a constant or perform signal level limiting or D.C. restoration.

Figure 5:
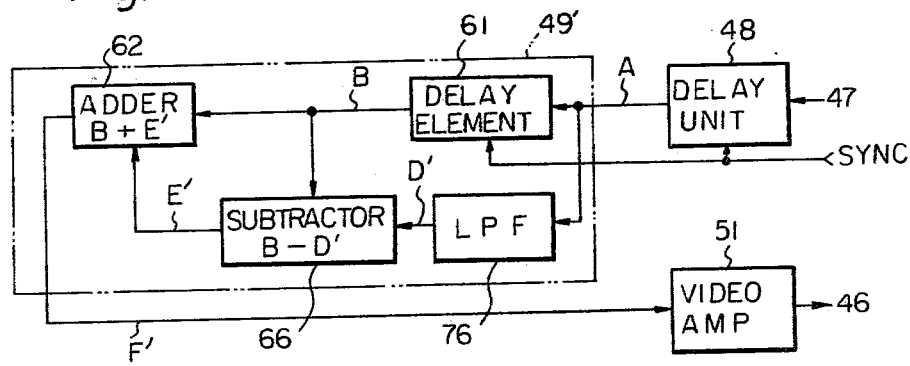
FIG. 5 is a block diagram of a second contour compensation means of the present invention.

FIG. 5 illustrates a modified contour compensation means 49' of the present invention. Like elements are designated by the same reference numerals used in FIG. 3. Corresponding but modified elements and signals are designated by the same reference numerals primed.

Figure 6:
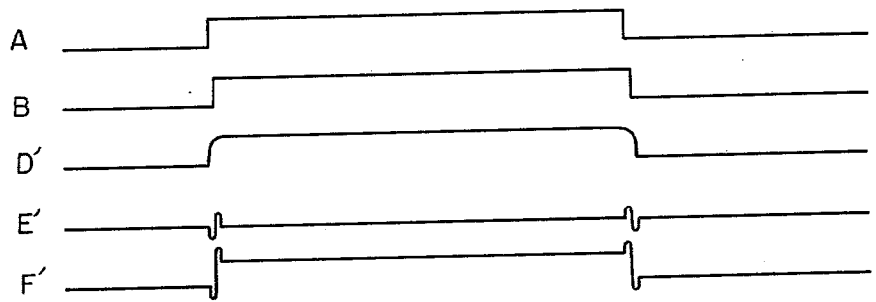
FIG. 6 is a timing diagram illustrating the operation of the contour compensation means of FIG. 5.

In the means 49' the delay element 63 and adder 64 are replaced by a low pass filter 76 which receives the signals A and produces signals D' which are illustrated in FIG. 6. The filter 76 comprises an integrating circuit or the like to round off the leading and trailing edges of the signals A to produce the signals D'. Comparison of the signals D' with the signals D will disclose that they are similar except that the leading and trailing edges of the signals D' rise and fall in a continuous, rather than in a stepwise manner as do the leading and trailing edges of the signals D. The signals E' and F' have positive and negative spikes which produce the same results as the corresponding spikes in the signals E and F. It will be noted that the spikes in the signals E' and F' are rounded rather than square as are the spikes in the signals E and F.

Figure 7:
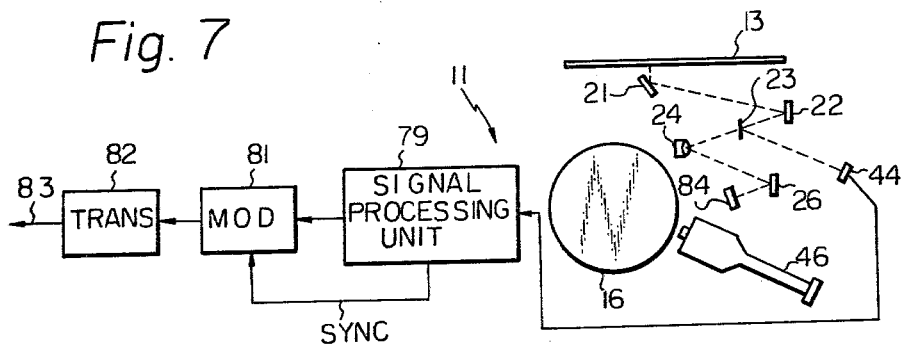
FIG. 7 is a block diagram illustrating the present apparatus operating in a facsimile transmission mode.

FIG. 7 shows how the apparatus 11 is utilized as a facsimile transmitter. The output of the array 44 is fed through a signal processing unit 79 and modulator 81 to a transmission unit 82 which transmits the modulated electrical signals to a remote receiver via a communication link 83 such as a telephone line. When the apparatus 11 is being used for facsimile transmission, a shutter 84 prevents the light image from being reflected from the mirror 26 onto the drum 16. Preferably, rotation of the drum 16 and the operation of the developing unit 27 and other units used for producing electrostatic copies is disabled.

Figure 8:
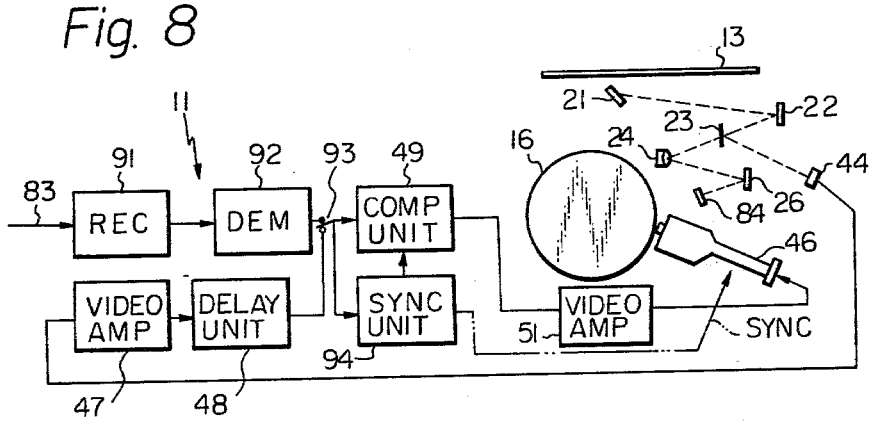
FIG. 8 is a block diagram illustrating the present apparatus operating in a facsimile reception mode.

FIG. 8 shows the apparatus 11 as being utilized as a facsimile receiver. The shutter 84 is moved to block the light image from the mirror 26 as during facsimile transmission. However, the developing unit 27 is energized whereas the optical imaging means 18 is disabled.

Electrical signals from a remote apparatus are fed to a receiving unit 91 of the apparatus 11 through the communication link 83. The signals represent an original document scanned by the remote apparatus. The receiving unit 91 feeds the signals through a demodulator 92 and a control switch 93 to the compensation unit 49. From the unit 49 the signals are fed to the imaging means 46 which radiates a light image corresponding to the signals onto the drum 16 to form an electrostatic image which is developed and transferred to a copy sheet to produce a facsimile reporduction. Further illustrated is a synchronization unit 94 which separates the SYNC signals from the video signals and applied them separately to the imaging means 46.

The control switch 93 may be electronic or mechanical and serves to selectively connect the input of the compensation unit 49 to the output of the delay unit 48 for electrostatic copying or to the output of the demodulator 92 for facsimile reception. In the facsimile reception mode, the compensation unit 49 may be bypassed if not required.

It will be further noted that the circuit arrangement of FIG. 2 will produce an electrostatic image of the document 13 on the drum 16 if the shutter 84 is moved into position to prevent an electrostatic image from being formed by the optical imaging means 18. In other words, only one electrostatic image will be formed by the electronic imaging means 46 with the optical imaging means 18 being disabled. Such an operation may be desirable under some circumstances, such as when an original document has a very dark background and apparent resolution is much more important than actual resolution. In this case, the intensity of the light image produced by the imaging means 46 will be approximately doubled.

In summary, it will be ssen that the present invention provides a combination copying-facsimile reproduction apparatus which produces actual resolution comparable to prior art apparatus but greatly improved apparent resolution in the electrostatic copying mode.

Various modifications will become possible for those skilled in the art after receiving the teachings of the present disclosure without departing from the scope thereof.

What is claimed is:

1. A reproduction apparatus including a moving photoconductive member and optical imaging means for radiating a light image of an original document onto the photoconductive member to form an electrostatic image of the document on the photoconductive member, characterized by comprising:

electronic scanning means for producing electrical signals corresponding to the document;

electronic imaging means for radiating a light image onto the photoconductive member corresponding to electrical signals applied to the electronic imaging means;

contour compensation means; and control means for connecting an output of the electronic scanning means to an input of the contour compensation means and an output of the contour compensation means to an input of the electronic imaging means, the optical imaging means, electronic scanning means, contour compensation means and electronic imaging means being so constructed that an electrostatic image of the document formed on the photoconductive member by the electronic imaging means is superimposed on the electrostatic image of the document formed on the photoconductive member by optical imaging means;

the optical imaging means being constructed to radiate a light image of the document onto the electronic scanning means;

the optical imaging means comprising optical means for focussing a light image of a linear portion of the document onto the photoconductive member and the electronic scanning means and feed means for producing relative movement between the optical means and the document in a direction perpendicular to the linear portion of the document.

2. An apparatus as in claim 1, in which the electronic scanning means comprises a linear photosensor array which is fixedly mounted.

3. A reproduction apparatus including a moving photoconductive member and optical imaging means for radiating a light image of an original document onto the photoconductive member to form an electrostatic image of the document on the photoconductive member, characterized by comprising;

electronic scanning means for producing electrical signals corresponding to the document;

electronic imaging means for radiating a light image onto the photoconductive member corresponding to electrical signals applied to the electronic imaging means;

contour compensation means;

control means for connecting an output of the electronic scanning means to an input of the contour compensation means and an output of the contour compensation means to an input of the electronic imaging means, the optical imaging means, electronic scanning means, contour compensation means and electronic imaging means being so constructed that an electrostatic image of the document formed on the photoconductive member by the electronic imaging means is superimposed on the electrostatic image of the document formed on the photoconductive member by the optical imaging means; and receiving means for receiving electrical signals, the control means being operative to connect an output of the receiving means to an input of the contour compensation means and an output of the contour compensation means to an input of the electronic imaging means and disable the optical imaging means for forming an electrostatic image on the photoconductive member corresponding to the received electrical signals.

4. A reproduction apparatus including a moving photoconductive member and optical imaging means for radiating a light image of an original document onto the photoconductive member to form an electrostatic image of the document on the photoconductive member, characterized by comprising:

electronic scanning means for producing electrical signals corresponding to the document;

electronic imaging means for radiating a light image onto the photoconductive member corresponding to electrical signals applied to the electronic imaging means;

contour compensation means; and control means for connecting an output of the electronic scanning means to an input of the contour compensation means and an output of the contour compensation means to an input of the electronic imaging means, the optical imaging means, electronic scanning means, contour compensation means and electronic imaging means being so constructed that an electrostatic image of the document formed on the photoconductive member by the electronic imaging means is superimposed on the electrostatic image of the document formed on the photoconductive member by the optical imaging means;

the optical imaging means being disposed upstream of the electronic imaging means in a direction of movement of the photoconductive member, the apparatus further comprising delay means connected between the electronic scanning means and the electronic imaging means for delaying the electrical signals produced by the electronic scanning means.

5. A reproduction apparatus including a moving photoconductive member and optical imaging means for radiating a light image of an original document onto the photoconductive member to form an electrostatic image of the document on the photoconductive member, characterized by comprising:

electronic scanning means for producing electrical signals corresponding to the document;

electronic imaging means for radiating a light image onto the photoconductive member corresponding to electrical signals applied to the electronic imaging means;

contour compensation means; and control means for connecting an output of the electronic scanning means to an input of the contour compensation means and an output of the contour compensation means to an input of the electronic imaging means, the optical imaging means, electronic scanning means, contour compensation means and electronic imaging means being so constructed that an electrostatic image of the document formed on the photoconductive member by the electronic imaging means is superimposed on the electrostatic image of the document formed on the photoconductive member by the optical imaging means;

the contour compensation means comprising first delay means for receiving the electrical signals from the electronic scanning means as first signals and delaying the first signals to produce second signals, second delay means for delaying the second signals to produce third signals, first adder means for adding the first and third signals to produce fourth signals, subtractor means for subtracting the fourth signals from the second signals to produce fifth signals and second adder means for adding the second signals and fifth signals to produce sixth signals which are fed to the electronic imaging means.

6. A reproduction apparatus including a moving photoconductive member and optical imaging means for radiating a light image of an original document onto the photoconductive member to form an electrostatic image of the document on the photoconductive member, characterized by comprising:

electronic scanning means for producing electrical signals corresponding to the document;

electronic imaging means for radiating a light image onto the photoconductive member corresponding to electrical signals applied to the electronic imaging means;

contour compensation means; and control means for connecting an output of the electronic scanning means to an input of the contour compensation means and an output of the contour compensation means to an input of the electronic imaging means, the optical imaging means, electronic scanning means, contour compensation means and electronic imaging means being so constructed that an electrostatic image of the document formed on the photoconductive member by the electronic imaging means is superimposed on the electrostatic image of the document formed on the photoconductive member by the optical imaging means;

the contour compensation means comprising delay means for receiving the electrical signals from the electronic scanning means as first signals and delaying the first signals to produce second signals, low pass filter means for receiving the first signals and rounding off leading and trailing edges thereof to produce third signals, subtractor means for subtracting the third signals from the second signals to produce fourth signals and adder means for adding the second and fourth signals to produce fifth signals which are fed to the electronic imaging means.

* * * * *